US007594852B2

(12) United States Patent
Rasmussen

(10) Patent No.: US 7,594,852 B2
(45) Date of Patent: Sep. 29, 2009

(54) GAMING MACHINE WITH INTERCHANGEABLE REEL DISPLAY ARRANGEMENT

(75) Inventor: James M. Rasmussen, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 415 days.

(21) Appl. No.: 11/412,741

(22) Filed: Apr. 27, 2006

(65) Prior Publication Data

US 2006/0252496 A1 Nov. 9, 2006

Related U.S. Application Data

(60) Provisional application No. 60/677,527, filed on May 4, 2005.

(51) Int. Cl.
*G07F 17/34* (2006.01)
*A63F 13/00* (2006.01)

(52) U.S. Cl. ............................. 463/20; 463/31; 463/32; 463/46; 273/143 R; 273/138.2

(58) Field of Classification Search ................... 463/20, 463/46, 31, 32; 273/143 R, 138.2
See application file for complete search history.

(56) References Cited

U.S. PATENT DOCUMENTS

| | | | |
|---|---|---|---|
| 4,440,457 A | 4/1984 | Fogelman et al. | |
| 6,475,087 B1 | 11/2002 | Cole | |
| 6,517,433 B2 | 2/2003 | Loose et al. | |
| 6,860,814 B2 | 3/2005 | Cole | |
| 2003/0087690 A1 | 5/2003 | Loose et al. | |
| 2004/0053699 A1 | 3/2004 | Rasmussen et al. | |
| 2004/0166927 A1 * | 8/2004 | Okada | 463/20 |
| 2004/0198485 A1 | 10/2004 | Loose et al. | |
| 2004/0248647 A1 | 12/2004 | Rothschild et al. | |
| 2004/0248648 A1 | 12/2004 | Rothschild et al. | |

FOREIGN PATENT DOCUMENTS

| | | |
|---|---|---|
| WO | WO 2006015046 A2 | 2/2006 |
| WO | WO 2006036486 A1 | 4/2006 |
| WO | WO 2006036948 A2 | 4/2006 |

* cited by examiner

*Primary Examiner*—Benjamin H Layno
(74) *Attorney, Agent, or Firm*—Nixon Peabody LLP

(57) ABSTRACT

A slot machine comprises a housing, a plurality of physical symbol-bearing reels mounted in the housing, and a display arrangement positioned in front of the reels and interchangeable in the same housing between at least two of the following: (i) a display panel without an interior cavity, (ii) a light-guiding panel having an illuminated interior, and (iii) a transmissive video display.

17 Claims, 5 Drawing Sheets

GAMING MACHINE WITH INTERCHANGEABLE REEL DISPLAY ARRANGEMENT

CROSS REFERENCE TO RELATED APPLICATIONS

This application claims the benefit of priority of U.S. Provisional Patent Application No. 60/677,527, filed May 4, 2005, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming machine having an interchangeable reel display system.

BACKGROUND OF THE INVENTION

A gaming machine is operable to conduct a wagering game such as physical reel slots, video slots, poker, keno, bingo, or blackjack. In response to a wager for purchasing a play of the game, the machine generates a random (or pseudo-random) event and displays an outcome of the random event on a primary display device in a form that can be understood by a player. The machine provides an award to the player if the outcome is one of the winning outcomes defined by a pay table. Occasionally, the random event may trigger a bonus game involving lively animations, display illuminations, special effects, and/or player interaction. Depending upon the type of wagering game conducted with the gaming machine, the primary display device for displaying the game outcome may include a physical slot reel assembly or a video display.

If the type of wagering game is a physical reel slot game played on a mechanical slot machine, the primary display device is a physical slot reel assembly including a plurality of rotatable symbol-bearing reels. The reels are rotated and stopped to place symbols on the reels in visual association with a display arrangement in the form of a display panel mounted in front of the reels. The displayed symbols represent the game outcome. A conventional display panel includes windows for viewing the individual physical reels of the slot reel assembly and such credit meters as a "bet" meter, "credit" meter, and a "win" meter.

Instead of a conventional display panel, the slot machine may include a display arrangement in the form of a light-guiding panel of the type disclosed in International Publication WO 2006/015046 and International Publication WO 2006/036486, both of which are incorporated herein by reference in their entireties. The light-guiding panel includes an outer edge to receive light from a peripheral light source and transmit the light through a panel interior defined by opposing front and rear surfaces. The rear surface may include an etched portion with fine recesses for reflecting the light. The light-guiding panel includes windows for viewing the physical reels and the credit meters. The light is substantially uniformly reflected through all but the window of the surface.

Alternatively, the slot machine may include a display arrangement in the form of a transmissive liquid crystal display (LCD) of the type disclosed in U.S. Publication 2004/0198485, U.S. Publication 2003/0087690, U.S. Pat. No. 6,517,433, and International Publication WO 2006/036948, all of which are incorporated herein by reference in their entireties. The transmissive LCD provides a video image that may selectively be made to have levels of transmissivity varying from transparent to opaque, thus allowing the display of images on the transmissive LCD while allowing selective portions of the physical reels to be seen through the transmissive LCD. The transmissive LCD may be outfitted with a touch screen for operating the gaming machine and is preferably illuminated with a backlight assembly positioned between the LCD and the physical reels. The backlight assembly may be integrated with the transmissive LCD in a single unit, or may be separate from the transmissive LCD and mounted adjacent thereto. The backlight assembly includes windows or cutouts aligned with the physical reels so that a player may view the reels.

For ease of manufacture, repair, maintenance, and reconfiguration of slot machines, it would be desirable to be able to easily interchange which reel display arrangement is used in front of the physical reels.

SUMMARY OF THE INVENTION

According to one aspect of the present invention, a slot machine comprises a housing, a plurality of physical symbol-bearing reels mounted in the housing, and a display arrangement positioned in front of the reels and interchangeable in the same housing between at least two of the following: (i) a display panel without an interior cavity, (ii) a light-guiding panel having an illuminated interior, and (iii) a transmissive video display.

Additional aspects of the invention will be apparent to those of ordinary skill in the art in view of the detailed description of various embodiments, which is made with reference to the drawings, a brief description of which is provided below.

DETAILED DESCRIPTION

Figure 1:
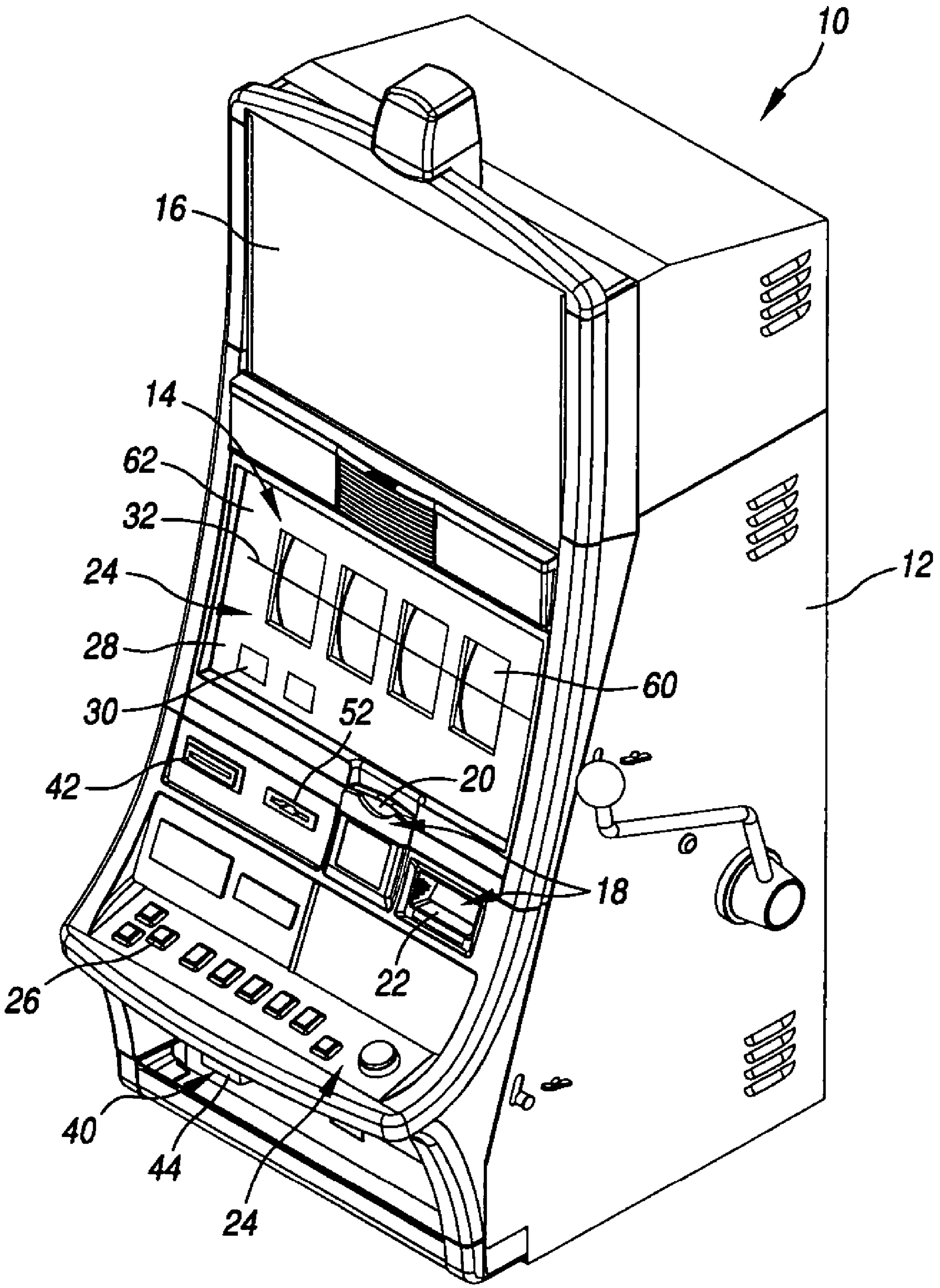
FIG. 1 is an isometric view of a gaming machine embodying the present invention, with a door thereof in a closed position and a reel display arrangement through which symbol-bearing reels of the machine are viewed.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 is preferably an electromechanical slot machine configured to play mechanical slots.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 preferably includes a plurality of physical symbol-bearing reels 60 that, in response to a wager, are rotated about a common axis and stopped to display symbols in visual association with at least one payline 32. The number of reels 60 may vary but typically range from three to five reels. The primary display 14 also includes a reel display arrangement 62 positioned in front of the reels and interchangeable in the same housing 12 between at least two of the following: (i) a display panel without an interior cavity, (ii) a light-guiding panel having an illuminated interior, and (iii) a transmissive video display. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
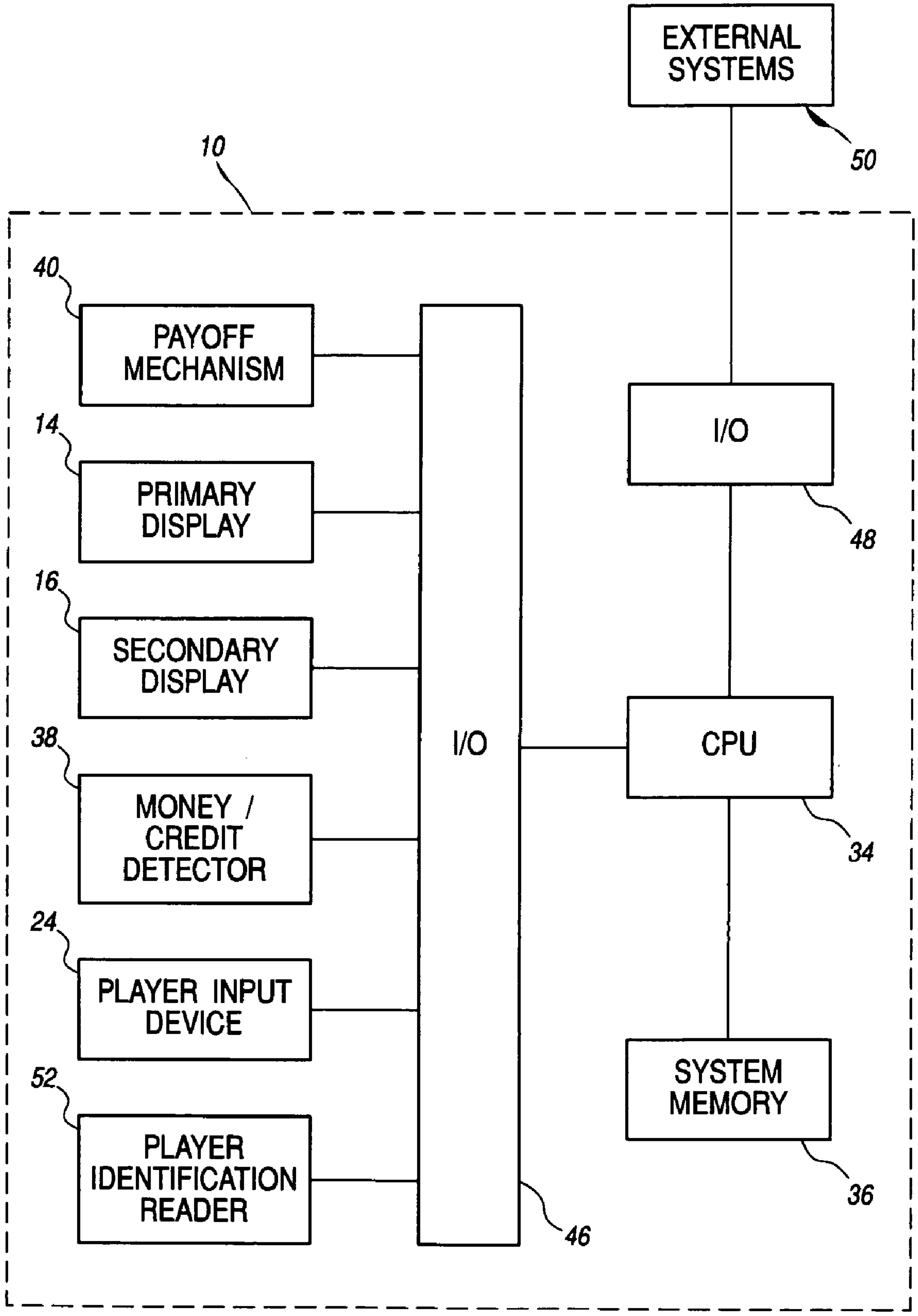
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
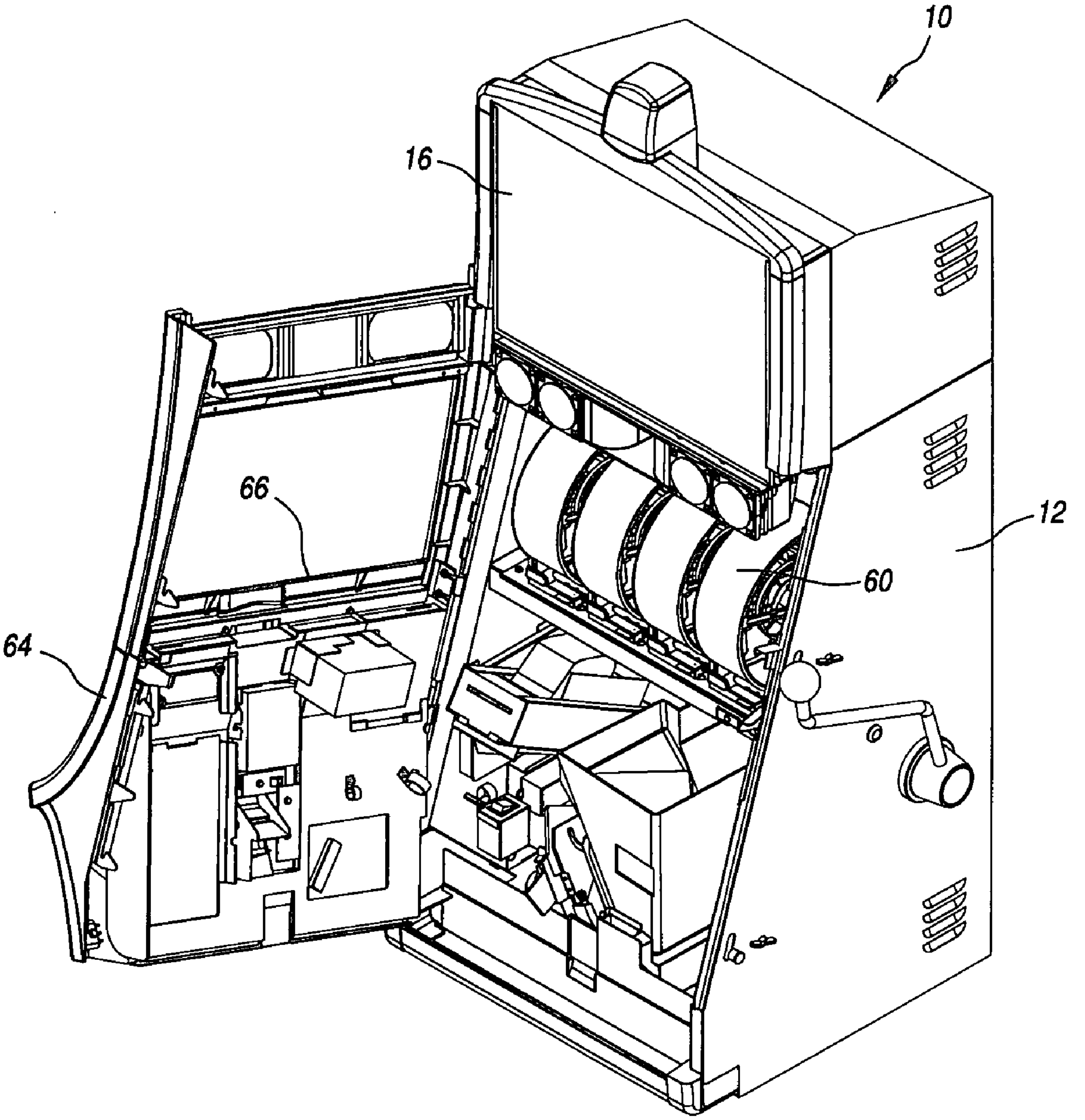
FIG. 3 is an isometric view of the gaming machine with the door thereof in an open position and without the reel display arrangement mounted to the door.

Turning now to FIG. 3, there is shown an isometric view of the slot machine 10 with a door 64 thereof in an open position. The slot machine 10 comprises the housing 12 and the plurality of physical symbol-bearing reels 60 mounted in the housing 12. The reels 60 may be assembled together on a common platform. The door 64 is hingedly connected to the rest (i.e. cabinet side) of the housing 12 for movement between the illustrated open position and the closed position in FIG. 1. The door 64 is illustrated in FIG. 3 without the reel display arrangement 62 mounted thereto.

Figure 4A:
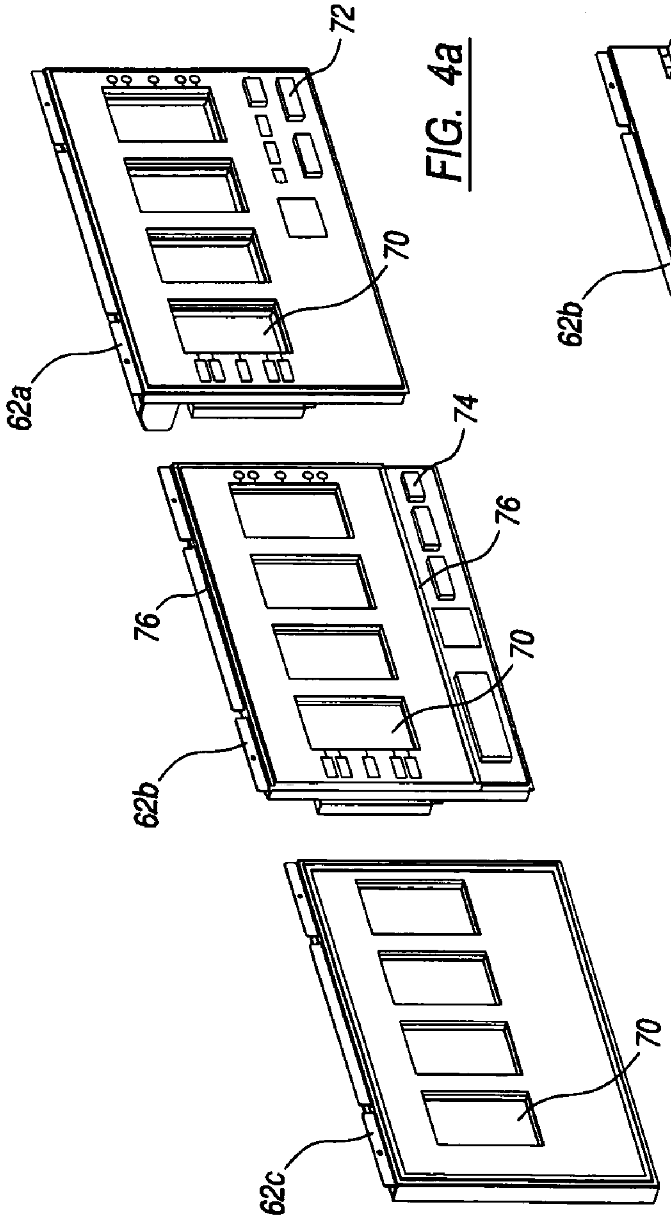
FIGS. 4*a* and 4*b* are isometric front views and rear views, respectively, of a plurality of possible reel display arrangements that may be interchangeably mounted in the housing of the gaming machine and serve as the reel display arrangement for viewing the reels.
Figure 4B:
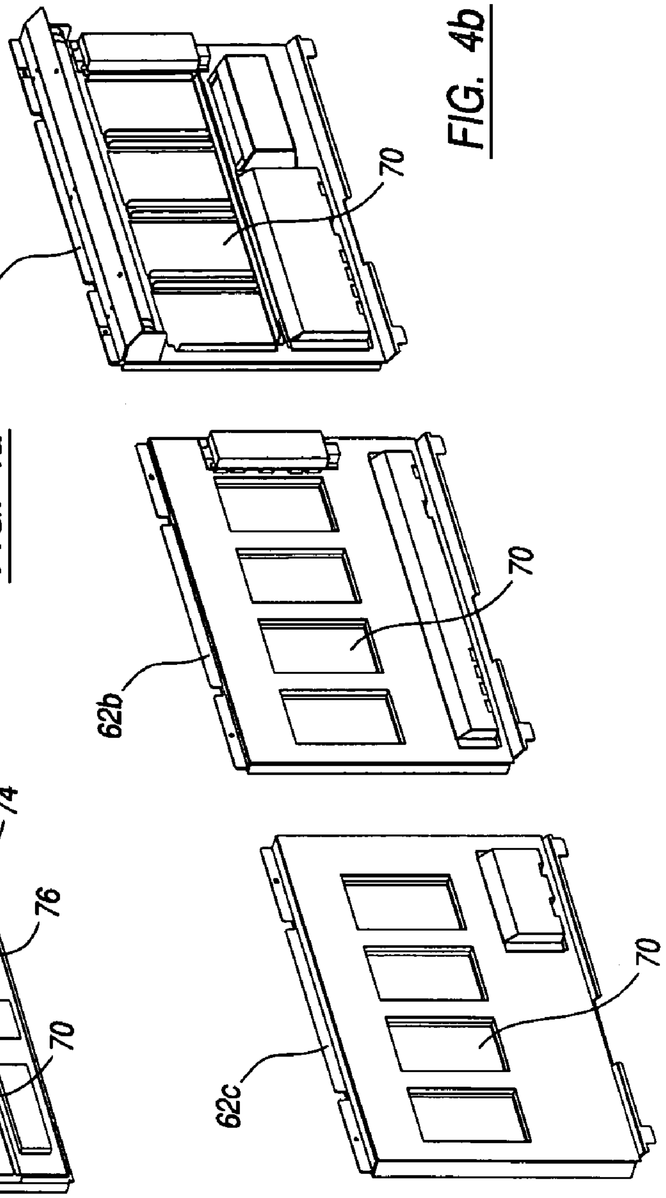

FIGS. 4*a* and 4*b* are isometric front and rear views, respectively, of three possible reel display arrangements 62*a-c* that may be interchangeably mounted to the door 64 of the housing 12 in FIG. 3 and serve as the reel display arrangement 62 for viewing the reels 60. When the door 64 is closed as in FIG. 1, the selected reel display arrangement 62*a*, 62*b*, or 62*c* is positioned in front of the reels 60.

The reel display arrangement 62 is interchangeable in the same housing 12 between at least two, and preferably all three, of the following: (i) a display panel 62*a* without an interior cavity, (ii) a light-guiding panel 62*b* having an illuminated interior, and (iii) a transmissive video display 62*c*. The selected display arrangement 62*a*, 62*b*, or 62*c* is mounted to the door 64 in FIG. 3 by screws, bolts, rivets, clamps, or other type of fastener. More specifically, as shown in FIG. 3 the door 64 includes a bezel 66. Each of the display panel 62*a*, the light-guiding panel 62*b*, and the transmissive video display 62*c* is interchangeably mountable to the same bezel 66 in FIG. 3. An adapter may be required to mount the transmissive video display 62*c* to the bezel 66 in FIG. 3. Regardless of which display arrangement 62*a*, 62*b*, or 62*c* is mounted to the door 64 in FIG. 3, the mounted display arrangement includes transparent portions or windows 70 aligned with the respective reels 60 to permit viewing of the reels 60 through the display arrangement when the door 64 is closed. Instead of individual windows 70 for viewing the respective reels 60, the windows 70 may be replaced with a single elongated window encompassing all of the reels 60.

Figure 5:
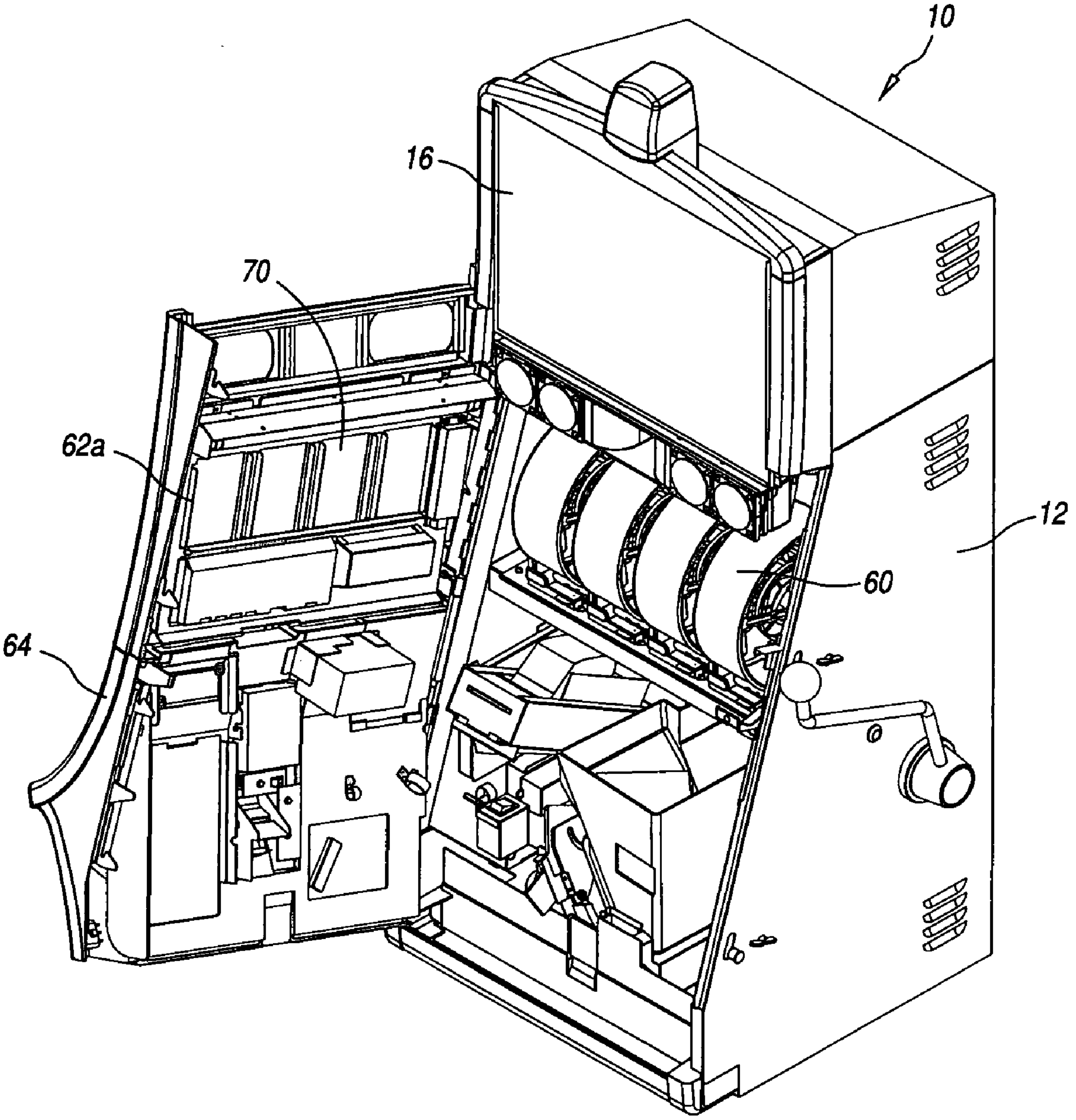
FIG. 5 is an isometric view of the gaming machine with the door thereof in the open position and with one of the reel display arrangements mounted to the door.

The display panel 62*a* includes a rectangular sheet of glass, plastic, or other material with graphics applied thereto. The graphics may be printed on the panel or incorporated in a film adhered to the panel. The graphics may, for example, relate to paylines, credit meters, and denomination. In addition to the windows 70 for viewing the individual physical reels 60 when the panel 62*a* is installed on the slot machine 10, the panel 62*a* includes windows 72 for viewing such credit meters as a "bet" meter, "credit" meter, and a "win" meter. Other portions of the display panel 62*a* are opaque to prevent a player from viewing an interior of the housing 12. FIG. 5 depicts the display panel 62*a* after it has been mounted to the door 64.

The light-guiding panel 62*b* is of the type disclosed in International Publication WO 2006/015046 and International Publication 2006/036486, both of which are incorporated herein by reference in their entireties. The light-guiding panel 62*b* includes an outer edge to receive light from a peripheral light source 76 (see FIG. 4*a*) and transmit the light through a panel interior defined by opposing front and rear surfaces. The rear surface may include an etched portion with fine recesses for reflecting the light. The front surface may carry graphics that are either directly applied to the surface or incorporated in a film adhered to the surface. The graphics may, for example, relate to paylines, credit meters, and denomination. In addition to the windows 70 for viewing the individual physical reels 60 when the panel 62*b* is installed on the slot machine 10, the panel 62*b* includes windows 74 for viewing such credit meters as a "bet" meter, "credit" meter, and a "win" meter. The light is substantially uniformly reflected through all but the windows.

The transmissive video display 62*c* may be a transmissive liquid crystal display (LCD) of the type disclosed in U.S. Publication 2004/0198485, U.S. Publication 2003/0087690, U.S. Pat. No. 6,517,433, and International Publication WO 2006/036948, all of which are incorporated herein by reference in their entireties. Alternatively, the transmissive video display 62*c* may be an organic light-emitting diode (LED) display as disclosed in the aforementioned International Publication WO 2006/036948. The transmissive LCD 62*c* provides a video image that may selectively be made to have levels of transmissivity varying from transparent to opaque, thus allowing the display of images on the transmissive LCD while allowing selective portions of the physical reels to be seen through the transmissive LCD. The transmissive LCD 62*c* may be outfitted with a touch screen for operating the gaming machine and is preferably illuminated with a backlight assembly positioned between the LCD and the physical reels. The backlight assembly may be integrated with the transmissive LCD 62*c* in a single unit, or may be separate from the transmissive LCD 62*c* and mounted adjacent thereto. The backlight assembly includes windows or cutouts aligned with the physical reels 60 so that a player may view the reels 60. The backlight assembly may, for example, be an organic LED display or alternatively a light-guiding panel similar to the light-guiding panel 62*b*.

In an alternative embodiment, instead of being mounted to the door 64 of the housing 12, the reel display arrangements 62*a-c* may be interchangeably mounted to the cabinet side of the housing 12. For example, like the door 64, a display arrangement 62*a*, 62*b*, or 62*c* may be connected to the cabinet side of the housing 12 by a hinge. Alternatively, a display arrangement may be mounted to a shelf within the housing 12 such as the shelf carrying the reels 60. When mounted in this manner, closing the door 64 against the display arrangement serves to complete the enclosure of the display arrangement.

The gaming machine 10 has a number of advantages. The standard base structure has multiple uses. And yet, because the base structure is standardized (except for primarily the reel display arrangement 62), it is easier and more cost-effective to manufacture, repair, and maintain. The standard structure minimizes the number of parts and knowledge necessary to manufacture, repair, and maintain the gaming machine. The three display arrangements 62*a-c* may be interchangeably mounted to the door 64. The placement of the windows 70 is such that any of the display arrangements 62*a-c* may be used with the reels 60. Depending upon the desired use, one of these three arrangements may be selected for mounting to the door without making substantial modifications to the rest of the base structure. In this manner, the cost of manufacturing different types of gaming machines may be reduced.

Furthermore, the gaming machine 10 may easily be reconfigured in the field or for resale. For example, a particular gaming establishment (e.g. casino) may first obtain the machine with one of the three display arrangements 62*a-c*. Based on consumer demand, the gaming establishment may find it desirable to offer the machine with a different one of the three display arrangements 62*a-c*. While retaining the rest of the base structure, this reconfiguration (or "conversion") is easily achieved by removing the initial display arrangement and replacing it with a different display arrangement.

Each of these embodiments and obvious variations thereof is contemplated as falling within the spirit and scope of the claimed invention, which is set forth in the following claims.

What is claimed is:

1. A slot machine comprising:

a housing;

a plurality of physical symbol-bearing reels mounted in the housing; and a display arrangement positioned in front of the reels and interchangeable in the same housing between at least two of the following:

(i) a display panel without an interior cavity, the display panel having first windows aligned with respective ones of the physical symbol-bearing reels to permit viewing of the physical symbol-bearing reels through the first windows, (ii) a light-guiding panel having an illuminated interior defined by opposing front and rear surfaces, the light-guiding panel having second windows aligned with respective ones of the physical symbol-bearing reels to permit viewing of the symbol-bearing reels through the second windows, the light-guiding panel including an outer edge to receive light from a peripheral light source and transmit the light through the interior, and (iii) a transmissive video display, the transmissive video display having third windows aligned with respective ones of the physical symbol-bearing reels to permit viewing of the symbol-bearing reels through the third windows, the transmissive video display configured to provide video images having levels of transmissivity varying between transparent and opaque;

whereby any of the display arrangements can be used with the physical symbol-bearing reels.

2. The machine of claim 1, wherein the housing includes a door coupled for movement between an open position and a closed position, the display arrangement being mounted to the door.

3. The machine of claim 2, wherein the door includes a bezel, each of the display panel and the light-guiding panel being interchangeably mountable to the same bezel.

4. The machine of claim 2, wherein the door includes a bezel, each of the display panel, the light-guiding panel, and the transmissive video display being interchangeably mountable to the same bezel.

5. The machine of claim 4, further including an adapter for mounting the transmissive video display to the bezel.

6. The machine of claim 1, wherein the transmissive video display includes a transmissive liquid crystal display.

7. An interchangeable reel display arrangement for a slot machine, the slot machine including a housing and a plurality of physical symbol-bearing reels mounted in the housing, the display arrangement being positioned in front of the reels and interchangeable in the same housing between at least two of the following:

(i) a display panel without an interior cavity, the display panel having first windows aligned with respective ones of the physical symbol-bearing reels to permit viewing of the physical symbol-bearing reels through the first windows, (ii) a light-guiding panel having an illuminated interior, defined by opposing front and rear surfaces, the light-guiding panel having second windows aligned with respective ones of the physical symbol-bearing reels to permit viewing of the symbol-bearing reels through the second windows, the light-guiding panel including an outer edge to receive light from a peripheral light source and transmit the light through the interior, and (iii) a transmissive video display, the transmissive video display having third windows aligned with respective ones of the physical symbol-bearing reels to permit viewing of the symbol-bearing reels through the third windows, the transmissive video display configured to provide video images having levels of transmissivity varying between transparent and opaque;

whereby any of the display arrangements can be used with the physical symbol-bearing reels.

8. The arrangement of claim 7, wherein the housing includes a door coupled for movement between an open position and a closed position, the display arrangement being mounted to the door.

9. The arrangement of claim 8, wherein the door includes a bezel, each of the display panel and the light-guiding panel being interchangeably mountable to the same bezel.

10. The arrangement of claim 8, wherein the door includes a bezel, each of the display panel, the light-guiding panel, and the transmissive video display being interchangeably mountable to the same bezel.

11. The arrangement of claim 10, further including an adapter for mounting the transmissive video display to the bezel.

12. The arrangement of claim 7, wherein the transmissive video display includes a transmissive liquid crystal display.

13. A method of modifying a slot machine, the slot machine including a housing and a plurality of physical symbol-bearing reels mounted in the housing, the method comprising:

providing a display arrangement positioned in front of the physical symbol-bearing reels and selected from a group of arrangement types consisting of (i) a display panel without an interior cavity, (ii) a light-guiding panel having an illuminated interior defined by opposing front and rear surfaces, the light-guiding panel including an outer edge to receive light from a peripheral light source and transmit the light through the interior, and (iii) a transmissive video display, the transmissive video display configured to provide video images having levels of transmissivity varying between transparent and opaque; and replacing, in the same housing, the display arrangement with another display arrangement of a different arrangement type in said group of arrangement types, whereby each of the display arrangements includes windows aligned with respective ones of the physical symbol-bearing reels to permit viewing of the physical symbol-bearing reels through the windows.

14. The method of claim 13, wherein the housing includes a door coupled for movement between an open position and a closed position, the display arrangement being mounted to the door.

15. The method of claim 14, wherein the door includes a bezel, each of the display panel and the light-guiding panel being interchangeably mountable to the same bezel.

16. The method of claim 14, wherein the door includes a bezel, each of the display panel, the light-guiding panel, and the transmissive video display being interchangeably mountable to the same bezel.

17. The method of claim 16, further including providing an adapter for mounting the transmissive video display to the bezel when the replacing step includes replacing the display arrangement with the transmissive video display.

* * * * *

UNITED STATES PATENT AND TRADEMARK OFFICE

CERTIFICATE OF CORRECTION

PATENT NO. : 7,594,852 B2
APPLICATION NO. : 11/412741
DATED : September 29, 2009
INVENTOR(S) : James M. Rasmussen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 563 days.

Signed and Sealed this

Twenty-eighth Day of September, 2010

David J. Kappos

*Director of the United States Patent and Trademark Office*